Feb. 6, 1951          T. EKLUND          2,540,571

ELASTIC RAILWAY CAR WHEEL

Filed Aug. 29, 1945

INVENTOR.

Torsten Eklund

BY James Aiken

Attorney

Patented Feb. 6, 1951

2,540,571

UNITED STATES PATENT OFFICE 2,540,571

ELASTIC RAILWAY CAR WHEEL

Torsten Eklund, Surahammar, Sweden, assignor to Allmanna Svenska Elektriska Aktiebolaget, Vasteras, Sweden, a Swedish corporation Application August 29, 1945, Serial No. 613,375
In Sweden September 7, 1944

3 Claims. (Cl. 295—11)

1

This invention relates to rubber cushioned vehicle wheels.

It has been known to join the wheel center with the rim by means of interposed elastic members, such as blocks of rubber. Difficulty is experienced with known constructions as the elastic members are mounted to take tension and shearing stresses, and fail under such stresses. This is especially true of rubber blocks which have a relatively low life when exposed to tension and shear, as well as to friction between rubber and/or rubber and metal.

The object of this invention is to produce a vehicle wheel, particularly a railway car wheel, in which rubber blocks are used to withstand compressive stresses, under which rubber has a relatively long life.

Generally this object is obtained by forming radial bores in the circumference of the center portion of the wheel, placing blocks composed of alternate layers of rubber and metal discs in each of these bores, and clamping the blocks in place under compression by a metal ring which also has bores to receive the blocks. The outer felly and tire or rim are then mounted upon the metal ring.

Figure 1:
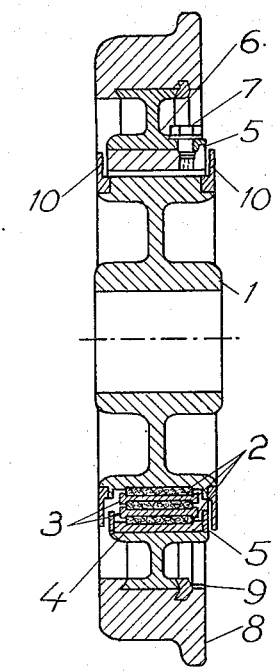
Fig. 1 is a cross-sectional view taken on the line OA—OB of Fig. 2.
Figure 2:
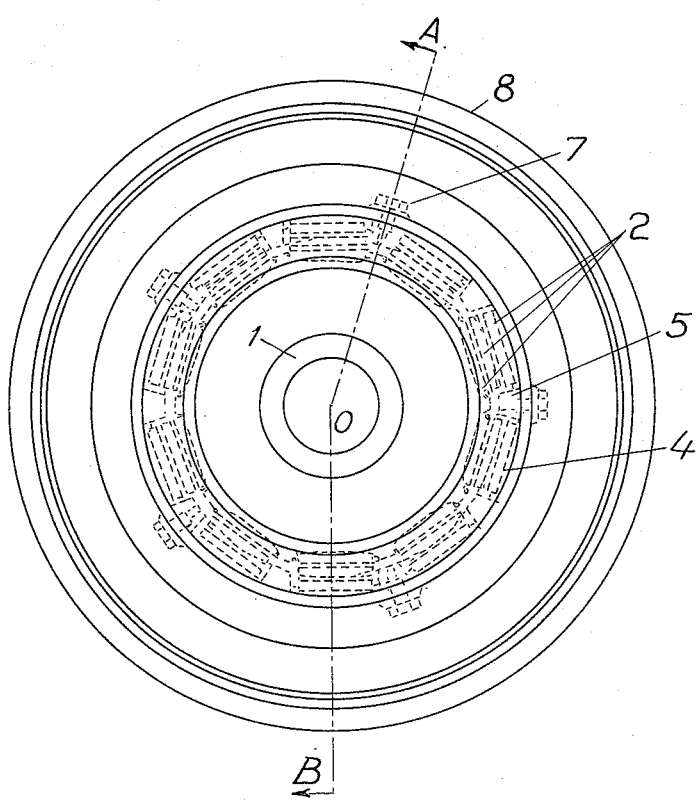
Fig. 2 is a side-elevational view of a vehicle wheel constructed according to the invention.

The center portion 1 of the wheel is provided with a number of circumferentially spaced and radially extending bores. Into each of these bores, blocks are inserted, each block consisting of rubber discs 2 separated by metal discs 3 and capped by an outer disc 4. The metal discs 3 decrease the shearing stress in the rubber discs 2 after the block is compressed into finally assembled position.

A supporting ring 5, of less internal diameter than the center 1 with the uncompressed blocks 2 thereon, is provided on its inner circumference with bores adapted to receive caps 4 of the blocks. In assembling the wheel, the blocks are compressed by a special tool, and ring 5 placed over the blocks, the latter fitting into the bores and being held there under a considerable compression between center 1 and ring 5. Consequently, due to this initially applied stress, the operating stresses upon the blocks will be practically only compressive stresses. As previously stated, the effect of shearing stresses upon the rubber discs 2 are decreased by employing the intermediate metal discs 3.

The felly 6, with the tire 8 shrunk thereon, and locked into place by ring 9, is secured to ring 5 by bolts 7 which extend radially through the ring and felly. Finally, in order to protect the resilient blocks, rings 10 are shrunk on each side of the periphery of center 1, these rings having flanges which extend radially to lap the space between the circumference of center 1 and supporting ring 5.

I claim as my invention:

1. A railway car wheel comprising a metal wheel center, an outer felly having an inner diameter larger than the outer diameter of said center, radially extending recesses in the periphery of said center, resilient rubber blocks inserted in said recesses and extending to the inner surface of said felly, a supporting ring located between said center and said felly and fitting said felly, said supporting ring being provided with radial bores traversed by said rubber blocks, and means for rigidly attaching said supporting ring to said felly.

2. A railway car wheel comprising a metal wheel center, an outer felly having an inner diameter larger than the outer diameter of said center, radially extending recesses in the periphery of said center, resilient rubber blocks inserted in said recesses and extending to the inner surface of said felly, said blocks in expanded condition having a radial length greater than the distance between said center and said felly, a supporting ring located between said center and said felly and fitting said felly, said supporting ring being provided with radial bores traversed by said rubber blocks, and means for rigidly attaching said supporting ring to said felly.

3. A railway car wheel comprising a metal wheel center, an outer felly having an inner diameter larger than the outer diameter of said wheel center, radially extending recesses in the periphery of said center, resilient rubber blocks inserted in said recesses and extending to the inner surface of said felly, a supporting ring located between said center and said felly and fitting said felly, said supporting ring being provided with radial bores traversed by said rubber blocks, means rigidly attaching said supporting ring to said felly, and an outer metal ring attached to said felly.

TORSTEN EKLUND.

REFERENCES CITED

The following references are of record in the file of this patent:

UNITED STATES PATENTS

| Number | Name | Date |
|---|---|---|
| 1,381,996 | Jackson | June 21, 1921 |
| 1,436,366 | Stoll | Nov. 21, 1922 |
| 1,442,047 | Chamberlain | Jan. 16, 1923 |
| 2,090,179 | Brownyer | Aug. 17, 1937 |
| 2,113,372 | Ellies | Apr. 5, 1938 |
| 2,390,290 | Beebe | Dec. 4, 1945 |